Jan. 1, 1963  M. STRASBERG  3,071,752
INTERFERENCE REDUCTION APPARATUS
Filed Jan. 2, 1958
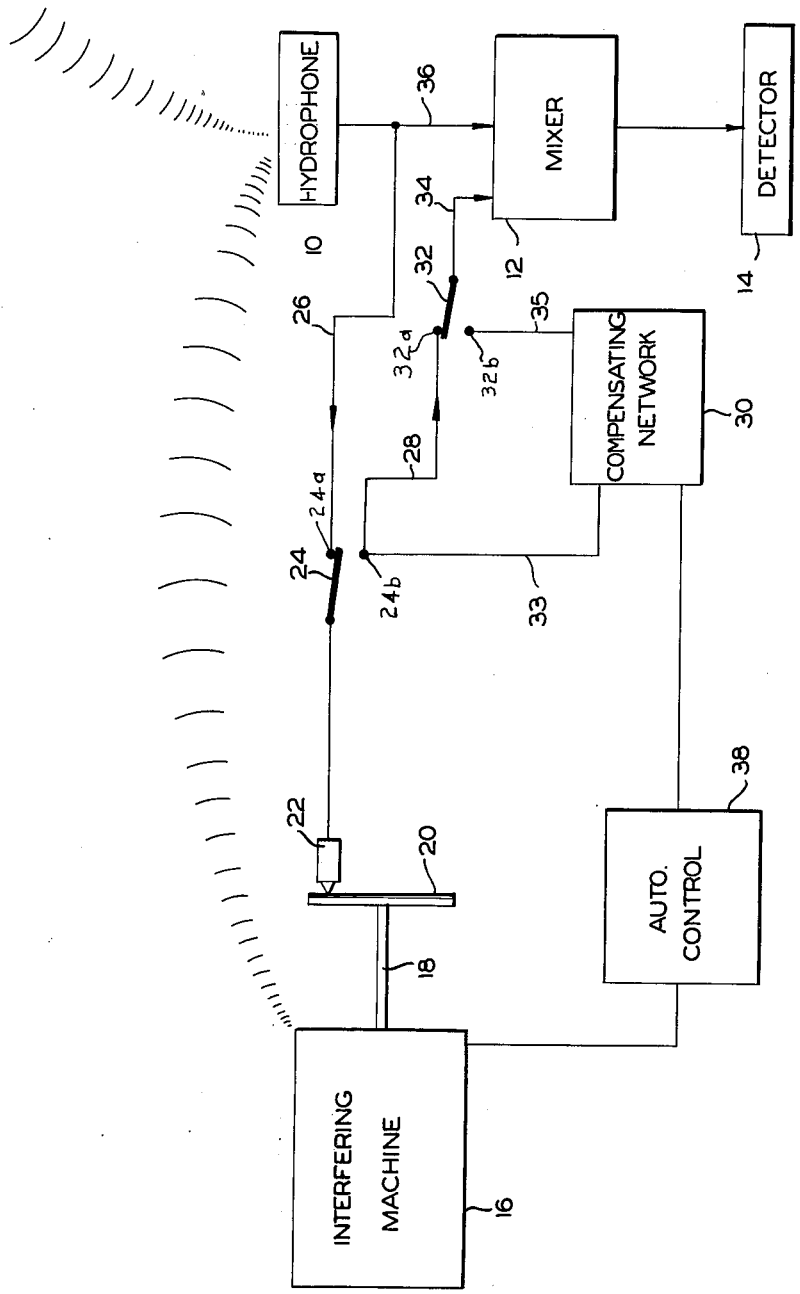
INVENTOR
MURRAY STRASBERG
BY
ATTORNEYS 3,071,752
INTERFERENCE REDUCTION APPARATUS
Murray Strasberg, Silver Spring, Md., assignor to the United States of America as represented by the Secretary of the Navy
Filed Jan. 2, 1958, Ser. No. 706,878
9 Claims. (Cl. 340—5)
(Granted under Title 35, U.S. Code (1952), sec. 266)

The invention described herein may be manufactured and used by or for the Government of the United States of America for governmental purposes without the payment of any royalties thereon or therefor.

This invention relates to an interference reduction apparatus. More specifically, the invention relates to an apparatus for reducing the interfering background noise picked up by a sonar system.

When sonar equipment is installed on board a ship, background noise from the ship itself or machinery on the ship may interfere with the detection of the sonar signals since the sonar transducer picks up all sounds indiscriminately. Often the source of this interference is known, but the generation of the interfering noise is inherent to the operation of the ship or the machine. As a specific example, the interference generated by the main engines of a snorkeling submarine, or by refrigeration or ventilation equipment on the submarine, can be eliminated by this invention.

This background noise may be classified as the non-random type or recurring type, as distinguished from random or unpredictable noise. The noise from the machine generally is periodic with a definite wave form, with a fundamental frequency which is either constant or related to the speed at which the machine is operated.

In accordance with the invention, the sonar background noise is reduced by introducing into the sonar system a secondary signal with such characteristics that this secondary signal, when combined with the original signal, results in a background noise of reduced amplitude. Wherever the secondary signal is introduced, however, its polarity and amplitude must be such that it will result in partial or complete cancellation of the original background noise. Normally this will require that the secondary signal be approximately equal in amplitude and of opposite polarity to the original background noise at the point of introduction.

If the background interference is a single frequency, the secondary signal may be generated by any conventional signal generator provided with means for controlling the amplitude, frequency, and phase of the signal. If, on the other hand, the interference has a complex wave form, the various components of the secondary signal may be generated and controlled by separate generators and combined or introduced separately in the sonar system.

In the preferred form of the invention, the secondary signal is obtained by recording a sample of the background noise itself on a signal recorder such as a magnetic wire, tape, disk or phonograph disk. The secondary signal is obtained by playing back the signal recording and introducing the play-back signals into the sonar system with the proper polarity in time synchronization to result in partial or complete cancellation of the original background noise. The proper time synchronization may be obtained automatically by mechanically coupling the signal recorder-play-back device to the particular machine whose background noise it is desired to reduce, using the machine itself to drive the recorder-play-back device. If the background noise originates from several machines, separate recording-play back devices may be coupled to each of the machines and a component of the secondary signal obtained by recording the background noise associated with a particular machine on its recorder only.

A primary object of the invention is therefore to disclose a method and means for reducing interfering noises of the non-random type in sonar systems.

Other objects and advantages of the invention will hereinafter become more fully apparent from the following description of the annexed drawing which illustrates a preferred embodiment, and wherein:

The drawing is a schematic diagram of a preferred embodiment of the invention.

Referring to the drawing, the sonar system as shown comprises a hydrophone 10, a mixer circuit 12, and a detector 14. The detector 14 may be of any convenient form such as head phones, a loud speaker or a cathode ray tube.

An interfering machine 16 which generates a non-random or recurring noise is shown having an auxiliary shaft 18 and a magnetic disk 20 mounted thereon. The output of the hydrophone 10 is sent along line 26 through switch 24 to a recording and reproducing magnetic head 22 which cooperates with the magnetic disk 20. In operation switch 24 is connected to terminal 24a and a recording is made of the noise input to the hydrophone 10 on the disk 20 by means of the recording head 22. This recording is generally done when there are very few or no external signals to the hydrophone 10 so that the recording on the disk 20 will correspond to the output noise of the interfering machine 16 as it appears at the hydrophone 10. When the sonar system is in service, switch 24 is connected with connection 24B and the recorded signal on the magnetic disk is picked up by the reproducing head 22 and passed along the line 28, through switch 32 and into mixer 12. Mixer 12 adjusts the amplitude and phase of the recorded signal and generally shifts the phase 180° or inverts the recorded signal and mixes it with the output of the hydrophone or line 36.

This mixing stage 12 appreciably reduces the amplitude of the noise generated by the interfering machine 16 and passes a signal from the hydrophone 10 to the detector 14.

Instead of performing the phase shifting and inversion in mixer 12, a compensating network 30, which is connected to terminal 24b and 32b, may be used. In this case switch 32 is connected to terminal 32b and the recorded signal in passed along lines 33, 35 and 34 to mixer 12. The compensating network may include an automatic control 38 which may be operated by the interfering machine 16.

Since the recording disk 20 is synchronized with the interference machine 16 any change in speed of the machine 16, which will be reflected by a change in the noise frequency and amplitude, will be cancelled effectively by the change in speed of the magnetic disk 20. This automatic adjustment of the output frequency of the recorder 20 is particularly advantageous in this application because a machine generally has a particular waveform or signature associated with it which does not appreciably change over a range of speed change of the machine. In case the signature of the machine 16 changes appreciably with a change of speed, a new recording on disk 20 may be made at the new speed and further automatic controlling means (not shown) may shift reproducing head 22 to the new recorded signal. The recording system should preferably comprise an erasing mechanism or other means to permit rerecording if the machine is changed or if it is otherwise found desirable. It may also be desirable to utilize separate heads for recording and reproducing.

If there are a number of interfering machines, a number of recording disks 20 and reproducing heads 22 operated by a number of shafts 18 will be required.

The invention is not limited to sonar systems. The application of the principle of the invention to other systems used for the detection of a signal in the presence of background interference will be apparent to those skilled in the art.

It should be understood, of course, that the foregoing disclosure relates to only a preferred embodiment of the invention and that it is intended to cover all changes and modifications for the example of the invention herein chosen for the purposes of the disclosure, which do not constitute departures from the spirit and scope of the invention.

What is claimed is:

1. In a sonar detection system with a recurring noise generator nearby, the combination of, transducer means for receiving both a sonar signal and the recurring noise, means for recording only the recurring noise picked up by said detection system synchronized with said generator, and means for mixing said recorded signal with the output of said trandsducer means whereby said recurring noise may be reduced.

2. A device for reducing interference with a received signal having a recurring noise generator in the vicinity thereof comprising transducer means for detecting both said signal and said recurring noise, means for recording said recurring noise synchronized with said recurring noise generator, means for playing back said recorded recurring noise, and means for mixing said recorded recurring noise with both said signal and said recurring noise whereby said recurring noise may be reduced.

3. A device for reducing interference with a received signal according to claim 2 but further characterized by said recording means comprising a magnetic recorder.

4. A device for reducing acoustic interference with a received sonar signal having a recurring acoustic noise generator in the vicinity thereof comprising transducer means for detecting both said sonar signal and said recurring acoustic noise, means connected to said transducer means for recording said recurring acoustic noise synchronized with said recurring acoustic noise generator, means for playing back said recorded recurring acoustic noise, means connected to said play-back means for correcting for the phase and amplitude changes of said recorded, recurring acoustic noise and means connected to said correcting means and said transducer means for mixing said recorded, recurring acoustic noise with both said sonar signal and said recurring acoustic noise whereby said recurring noise may be reduced.

5. A device for reducing interference with a received signal according to claim 4 but further characterized by a non-random recurring acoustic noise generator in the vicinity of said transducer means.

6. A device for reducing interference with a received signal according to claim 5 but further characterized by a switching means for selectively connecting said transducer means and said correcting means to said recording means.

7. An interference reduction apparatus for sonar systems comprising a hydrophone for generating electrical signals responsive to underwater sounds, a non-random noise generator in the vicinity of said hydrophone, a magnetic recorder having a recording surface and a magnetic recording and reproducing head for recording said signals, means for driving said magnetic recorder synchronized with said noise generator, a compensating network for adjusting the relative phase and amplitude of the recorded signals from said magnetic reproducing head, first switching means for selectively connecting said hydrophone and said compensating network to said magnetic recording and reproducing head, a mixer connected to said hydrophone for mixing said electrical signals and said recorded signals in the proper polarity, phase and amplitude, whereby said non-random noise may be substantially reduced, second switching means for selectively connecting said mixer to said compensating network and said magnetic reproducing head, and a display device connected to said mixer whereby said electrical signals may be displayed.

8. In a method of reducing interference from a recurring noise generator with a sonar signal, the steps of: recording the recurring noise before the sonar signal is received, detecting the signal, reproducing the noise in synchronism with said recurring noise generator, and subtracting said reproduced noise from said sonar signal whereby the signal to noise ratio of said sonar signal is improved.

9. In a method of reducing interference from a recurring acoustic noise generator with a received acoustic signal, the steps of: detecting said recurring acoustic noise with a transducer before said acoustic signal is received, recording said detected recurring acoustic noise, detecting the combination of said recurring acoustic noise and said acoustic signal with said transducer, reproducing said recorded recurring acoustic noise in synchronism with said recurring noise generator, and subtracting said reproduced acoustic noise from said combination of said recurring acoustic noise and said acoustic signal whereby the signal to noise ratio is improved.

References Cited in the file of this patent

UNITED STATES PATENTS

| | | |
|---|---|---|
| 1,207,388 | Fessenden | Dec. 5, 1916 |
| 1,312,809 | Scribner et al. | Aug. 12, 1919 |
| 1,480,217 | Mills | Jan. 8, 1924 |
| 1,529,520 | Watkins | Mar. 9, 1925 |
| 1,753,610 | Loth | Apr. 8, 1930 |
| 2,043,416 | Lueg | June 9, 1936 |
| 2,083,653 | Kasemann | June 15, 1937 |
| 2,129,860 | Mitchell | Sept. 13, 1938 |
| 2,150,223 | Hollmann | Mar. 14, 1939 |
| 2,376,730 | Steinhoff | May 22, 1945 |
| 2,400,552 | Hoover | May 21, 1946 |
| 2,410,424 | Brown | Nov. 5, 1946 |
| 2,444,069 | Sivian | June 29, 1948 |
| 2,546,025 | Breimer | Mar. 20, 1951 |
| 2,580,148 | Wirkler | Dec. 25, 1951 |
| 2,776,020 | Conover et al. | Jan. 1, 1957 |
| 2,800,654 | De Rosa | July 23, 1957 |
| 2,966,549 | Fogel | Dec. 27, 1960 |
| 2,978,577 | Ketchledge | Apr. 4, 1961 |